United States Patent
Jang et al.

(10) Patent No.: US 9,319,331 B2
(45) Date of Patent: Apr. 19, 2016

(54) DATA TRANSMISSION RATE CONTROL METHOD AND SYSTEM IN UPWARD VERTICAL HANDOVER IN OVERLAY NETWORK ENVIRONMENT

(75) Inventors: Ju-Wook Jang, Seoul (KR); Seung Su Kim, Seoul (KR)

(73) Assignee: INDUSTRY-UNIVERSITY COOPERATION FOUNDATION SOGANG UNIVERSITY (KR)

( * ) Notice: Subject to any disclaimer, the term of this patent is extended or adjusted under 35 U.S.C. 154(b) by 139 days.

(21) Appl. No.: 14/111,827

(22) PCT Filed: Apr. 13, 2012

(86) PCT No.: PCT/KR2012/002828
§ 371 (c)(1),
(2), (4) Date: Dec. 9, 2013

(87) PCT Pub. No.: WO2012/141533
PCT Pub. Date: Oct. 18, 2012

(65) Prior Publication Data
US 2014/0086048 A1    Mar. 27, 2014

(30) Foreign Application Priority Data
Apr. 15, 2011   (KR) .................. 10-2011-0035245

(51) Int. Cl.
*H04L 12/807* (2013.01)
*H04L 1/18* (2006.01)
(Continued)

(52) U.S. Cl.
CPC ............... *H04L 47/27* (2013.01); *H04L 1/187* (2013.01); *H04L 1/188* (2013.01); *H04L 1/1809* (2013.01);
(Continued)

(58) Field of Classification Search
CPC ..... H04L 1/1809; H04L 1/188; H04L 47/193; H04L 1/187; H04L 47/27; H04L 2001/0092; H04W 36/02; H04W 28/0226; H04W 36/0005; H04W 28/0289; H04W 28/0242
See application file for complete search history.

(56) References Cited

U.S. PATENT DOCUMENTS

2008/0062926 A1    3/2008   Oba

FOREIGN PATENT DOCUMENTS

| KR | 1020040067343 | 7/2004 |
| KR | 1020080002350 | 1/2008 |

(Continued)

OTHER PUBLICATIONS

Kim, "Efficient and QoS Guaranteed Data Transport in Heterogeneous Wireless Mobile Networks," May 2006, Georgia Institute of Technology.*
Xiuchao, "Improving TCP Performance in the Mobile, High Speed, Heterogenous and Evolving Internet," 2009, National University of Singapore.*

(Continued)

*Primary Examiner* — Jae Y Lee
(74) *Attorney, Agent, or Firm* — Cantor Colburn LLP

(57) ABSTRACT

Provided is a data transmission rate control method in upward vertical handover in an overlay network environment, including: a TCP (Transmission Control Protocol) sender checking whether or not a retransmission timeout event occurs while communicating with a TCP receiver through a dual interface in a TCP scheme; the TCP sender storing a sequence number of a packet having the largest sequence number among transmitting packets, and after that, performing congestion control if the retransmission timeout event occurs; the TCP sender checking whether or not ACK signal corresponding to a sequence number which is equal to or smaller than the stored sequence number is received after the TCP sender performs the congestion control; and the TCP sender determining to execute upward vertical handover if the ACK signal is received.

6 Claims, 5 Drawing Sheets

(51) Int. Cl.
  *H04W 36/02* (2009.01)
  *H04W 28/02* (2009.01)
  *H04W 36/00* (2009.01)
  *H04L 12/801* (2013.01)
  *H04L 1/00* (2006.01)

(52) U.S. Cl.
  CPC ......... *H04L 47/193* (2013.01); *H04W 28/0226* (2013.01); *H04W 28/0242* (2013.01); *H04W 28/0289* (2013.01); *H04W 36/0005* (2013.01); *H04W 36/02* (2013.01); *H04L 2001/0092* (2013.01)

(56) References Cited

FOREIGN PATENT DOCUMENTS

KR  1020100073890  7/2010
KR  1020110013817  2/2011

OTHER PUBLICATIONS

Kim et al., "Improved TCP Performance during the Upward Vertical Handover Using an IEEE 802.21 MIHF Framework," Sep. 22, 2011, ICHIT 2011, LNCS 6935, pp. 197-204.*
International Search Report—PCT/KR2012/002828 dated Nov. 28, 2012.

* cited by examiner

US 9,319,331 B2

DATA TRANSMISSION RATE CONTROL METHOD AND SYSTEM IN UPWARD VERTICAL HANDOVER IN OVERLAY NETWORK ENVIRONMENT

TECHNICAL FIELD

The present invention relates to a mobile communication technique, and more particularly, a data transmission rate control method in upward vertical handover in an overlay network environment, which is capable of solving a problem in that a data transmission rate is decreased due to the performing of congestion control by the occurrence of a retransmission timeout event according to network characteristics such as an RTT (round trip time) in the overlay network environment during the upward vertical handover even in the state that packet loss caused by channel congestion does not occur, capable of preventing an overload from being exerted on a new network in a slow start phase mode by setting an optimum initial slow start limit value for the new network during the upward vertical handover, and capable of setting an optimum retransmission timeout for the new network during the upward vertical handover.

BACKGROUND ART

In mobile communication systems, data service has been gradually increased, and thus, in most cases, TCP (transmission control protocol) is employed as an upper layer protocol. However, since the TCP is designed on the basis of a wired network, the TCP does not reflect wireless channel errors frequently occurring in a wireless network. Therefore, in the TCP, a wireless channel error may be recognized as channel congestion so that congestion control is performed.

On the other hand, it is expected that a next-generation network has an overlay structure, and thus, vertical handover does more frequently occur according to movement of mobile terminals.

However, when a mobile terminal enters from a network having a relatively narrow coverage, a high transmission rate, and a short RTT (round trip time) such as a WLAN (public wireless LAN service) into a network having a wide coverage, a low transmission rate, and a long RTT such as a 3G network, the mobile terminal undergoes handover. When upward vertical handover is executed, although packet loss caused by channel congestion according to a difference in network characteristics such as an RTT does not occur, a retransmission timeout event may occur in a TCP sender.

In the conventional TCP such as a TCP Reno, the retransmission time-out event is recognized as channel congestion, and thus, congestion control is performed when the retransmission time-out event generates, so that a transmission rate is greatly decreased.

Therefore, in the related art, a technique of preventing congestion control from being performed due to erroneous recognition of the occurrence of a retransmission time-out event as channel congestion during the upward vertical handover has been required to be developed.

DISCLOSURE

Technical Problem

The present invention is to provide a data transmission rate control method in upward vertical handover in an overlay network environment, which is capable of solving a problem in that a data transmission rate is decreased due to the performing of congestion control according to the occurrence of a retransmission timeout event even in the state that packet loss caused by channel congestion according to network characteristics such as an RTT (round trip time) in the overlay network environment does not occur during the upward vertical handover, capable of preventing an overload from being exerted on a new network in a slow start phase mode by setting an optimum initial slow start limit value for the new network during the upward vertical handover, and capable of setting an optimum retransmission timeout for the new network during the upward vertical handover.

Technical Solution

According to an aspect of the present invention, there is provided a data transmission rate control method in upward vertical handover in an overlay network environment, including: a TCP (Transmission Control Protocol) sender checking whether or not a retransmission timeout event occurs while communicating with a TCP receiver through a dual interface in a TCP scheme; the TCP sender storing a sequence number of a packet having the largest sequence number among transmitting packets, and after that, performing congestion control if the retransmission timeout event occurs; the TCP sender checking whether or not ACK signal corresponding to a sequence number which is equal to or smaller than the stored sequence number is received after performing the congestion control; and the TCP sender determining to execute the upward vertical handover if the ACK signal is received.

BEST MODE

According to the present invention, a TCP sender can be allowed to recognize upward vertical handover in order to solve a problem in that a data transmission rate is decreased due to the performing of congestion control according to the occurrence of a retransmission timeout event according to network characteristics such as an RTT (round trip time) in the overlay network environment during the upward vertical handover even in the state that packet loss caused by channel congestion does not occur.

In addition, according to the present invention, if the upward vertical handover is recognized, an overload is prevented from being exerted on a new network in a slow start phase mode by setting an optimum initial slow start limit value for the new network.

In addition, according to the present invention, a retransmission timeout event is prevented from unnecessarily occurring in the new network by setting the optimum retransmission timeout for the new network during the upward vertical handover.

The present invention is based on an overlay network supporting soft vertical handover, so that the present invention supports make-before break (MBB). Therefore, since a mobile terminal executing upward vertical handover performs connecting with a new network before disconnecting from an old network, the mobile terminal operates in a dual mode where communication is available through two networks during the upward vertical handover.

Figure 1:
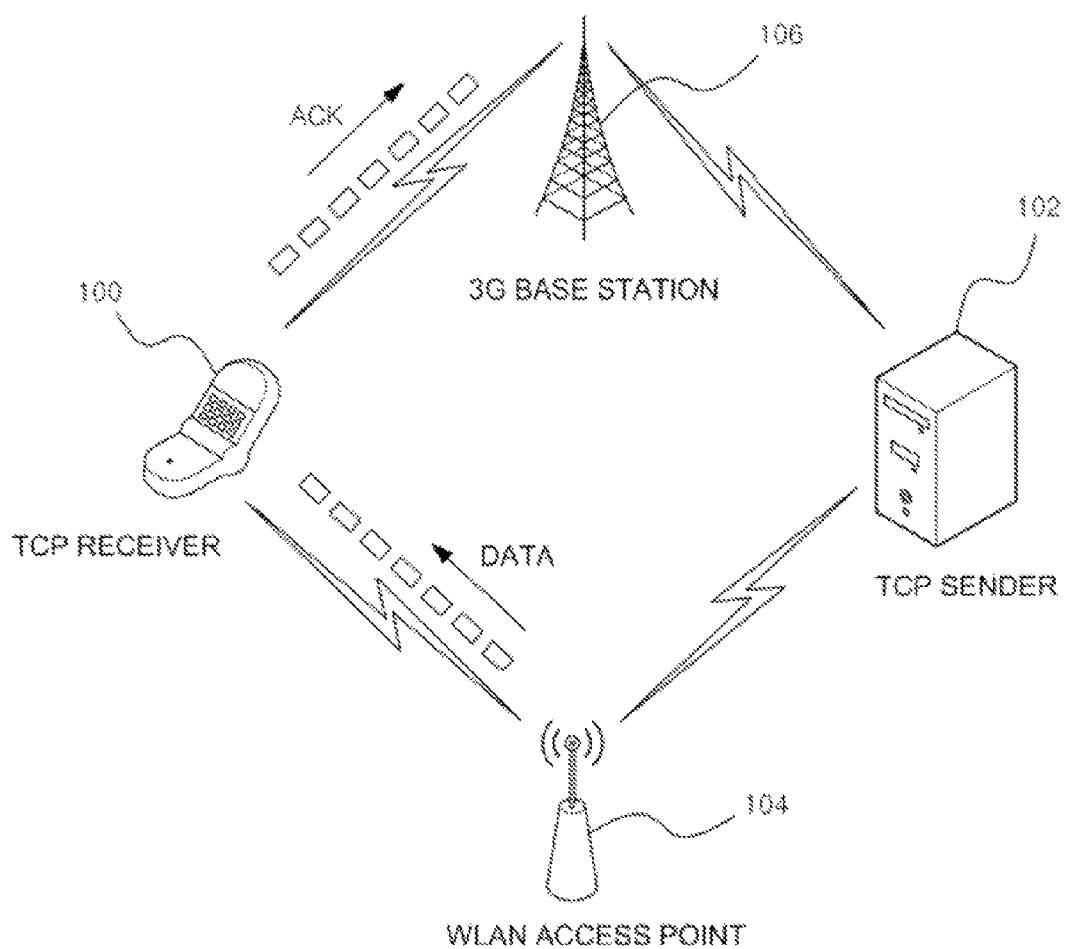
FIG. 1 is a diagram illustrating a configuration of a TCP system in an overlay network environment according to an exemplary embodiment of the present invention.

FIG. 1 is a diagram illustrating a configuration of a TCP system in an overlay network environment according to an exemplary embodiment of the present invention. The TCP system is configured to include a TCP receiver 100 and a TCP sender 102. The TCP receiver 100 and the TCP sender 102 operate in a dual mode of 3G network communication through a 3G base station 106 and WLAN communication through a WLAN access point 104. Particularly, in the upward vertical handover, the TCP sender 102 transmits data through the WLAN and, after that, receives an ACK (acknowledge) signal from the TCP receiver 100 through the 3G network.

The 3G base station 106 and the relay device such as the WLAN access point 104 supplies network information such as buffer sizes thereof to the TCP sender 102.

Figure 4:
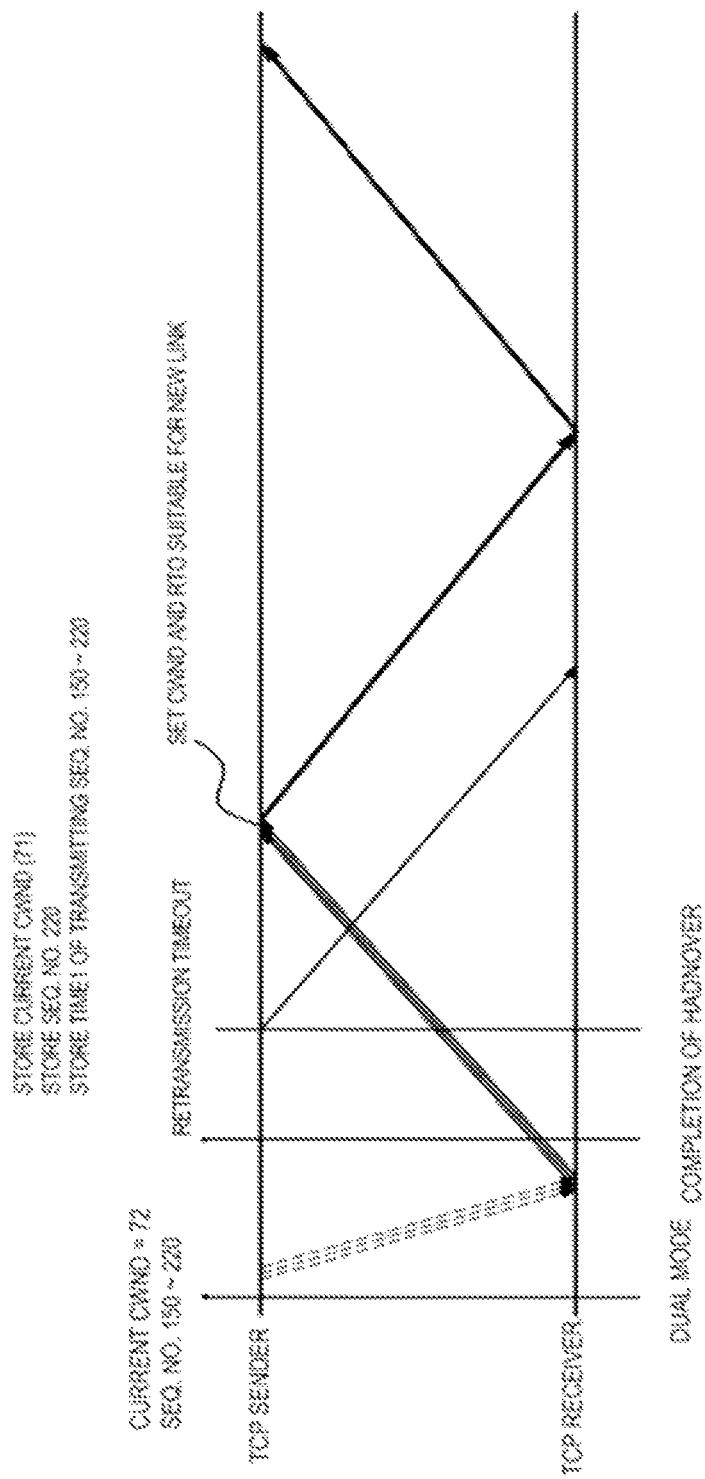

As illustrated in FIG. 4, while the TCP sender 102 communicates with the TCP receiver 100 through a dual interface in a TCP scheme, the TCP sender 102 checks whether or not the retransmission timeout event occurs. If the retransmission timeout event occurs, the TCP sender 102 stores the sequence number of the packet having the largest sequence number among the transmitted packets, and after that, the TCP sender 102 executes congestion control. After the execution of the congestion control, the TCP sender 102 checks whether or not an ACK signal corresponding to the packet having a sequence number equal to or smaller than the stored sequence number. If the ACK signal is received, the TCP sender 102 determines to execute the upward vertical handover. The sequence numbers of the packets are sequentially allocated.

Next, the TCP sender 102 calculates and sets a congestion window size of the new network. When the TCP sender 102 determines to execute the upward vertical handover, the TCP sender 102 calculates and sets the retransmission timeout time RTO in the new network.

Figure 2:
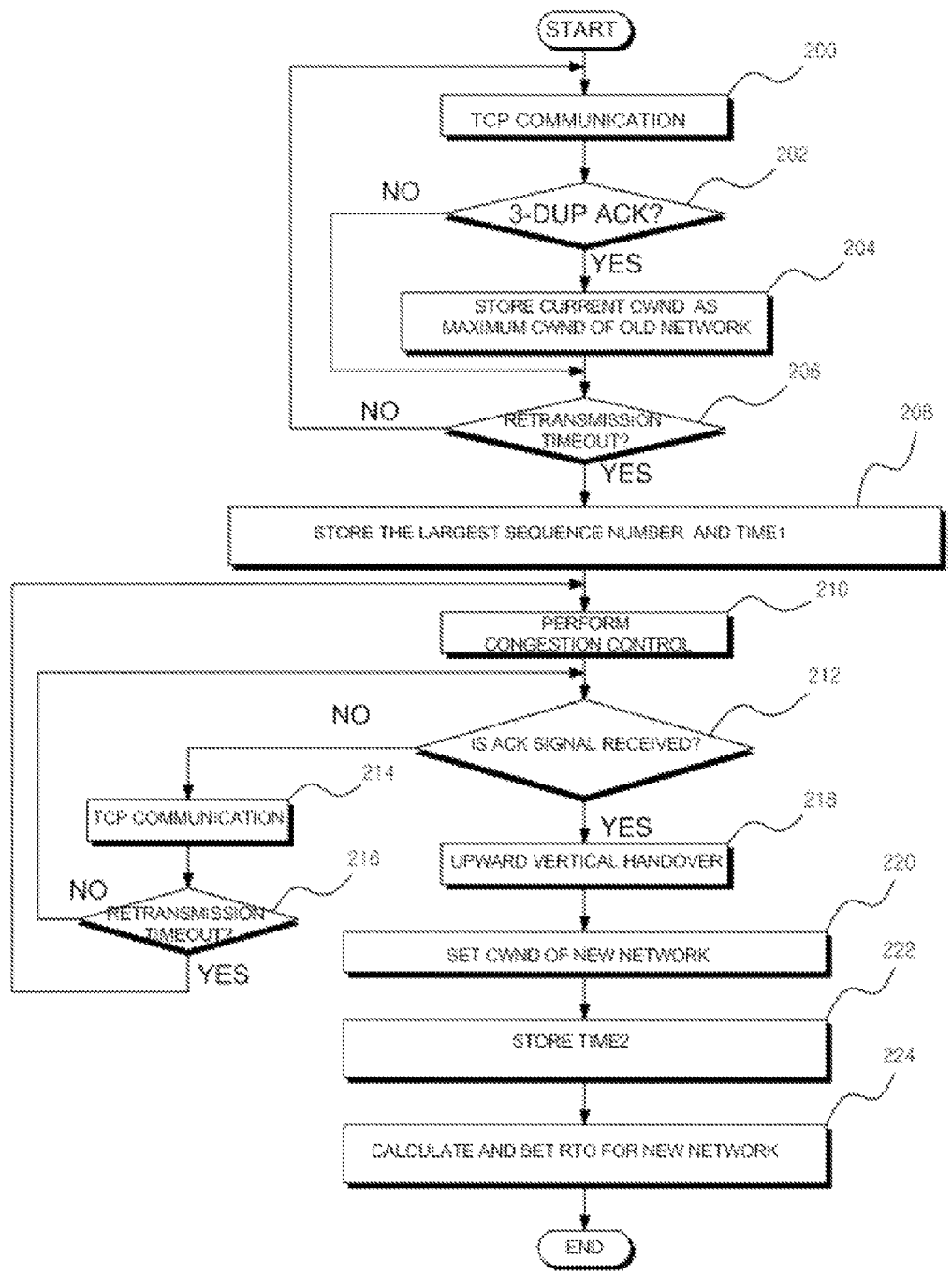
FIG. 2 is a flowchart of a data transmission rate control method in upward vertical handover in an overlay network environment according to an exemplary embodiment of the present invention.

Now, a data transmission rate control method in upward vertical handover in an overlay network environment which can be applied to the above-described TCP system in the overlay network environment according to the exemplary embodiment of the present invention will be described in detail with reference to a flowchart of FIG. 2.

While the TCP sender 102 performs normal TCP communication (Step 200), the TCP sender 102 stores the current congestion window size cwnd as a maximum congestion window size Old_Max_CW of an old network every time 3-dup ACK signals are received (Steps 202 and 204).

In addition, every time the retransmission timeout event occurs while executing the normal TCP communication (Step 206), namely, every time a response to the transmitted packet is not received until a predefined time for the retransmission timeout elapses, the TCP sender 102 stores the sequence number of the packet having the largest sequence number among the transmission packets as the maximum sequence number and stores a first time TIME1 from the transmission time point of the transmission packet to the time point of the occurrence of the retransmission timeout event (Step 208). Next, the TCP sender 102 executes the congestion control based on the occurrence of the retransmission timeout event (Step 210).

Next, the TCP sender 102 checks whether or not the ACK signal corresponding to the sequence number equal to or smaller than the maximum sequence number is received (Step 212).

If the ACK signal is received, the TCP sender 102 determines to execute the upward vertical handover and calculates and sets the congestion window size cwnd of the new network (Step 220).

Now, the process of calculating the congestion window size cwnd in the new network will be described.

First, the TCP sender 102 calculates a weighting factor K by using Mathematical Formula 1.

Weighting Factor Value $(K)$=[Old link BDP $(\lambda_{old}+1)$]/[New link BDP $(\lambda_{new}+1)$]  [Mathematical Formula 1]

Figure 5:
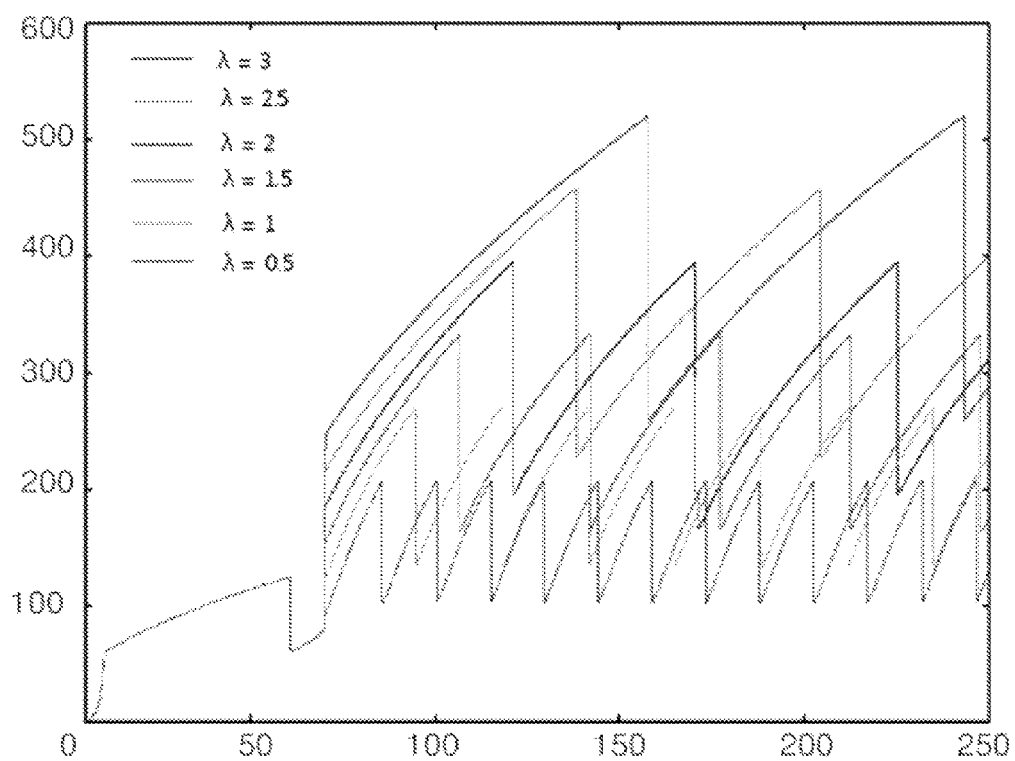
FIG. 5 is a diagram illustrating a change in data capacity of a link according to a buffer size.

The weighting factor K is a ratio of a data capacity of a link in a new network New_link_BDP($\lambda_{new}$+1) to a data capacity of a link in an old network Old_link_BDP($\lambda_{old}$+1). The A is a ratio of a BDP (bandwidth delay product) of an i-th network to a buffer size of a relay device. Namely, as illustrated in FIG. 5, the data capacity of a network depends on the buffer size of the relay device as well as the BDP. Therefore, in the present invention, the weighting factor K is defined as a ratio of a product of the BDP of the old network and the buffer size ($\lambda_{old}$+1) of the relay device to a product of the BDP of the new network and the buffer size ($\lambda_{new}$+1) of the relay device as expressed by Mathematical Formula 1.

As described above, if the weighting factor K is calculated, the TCP sender 102 calculates an optimum congestion window size of the new network by using Mathematical Formula 2.

Congestion Window Size (cwnd)=(Old_Max_CW/2)×$K$  [Mathematical Formula 2]

As expressed by Mathematical Formula 2, the optimum congestion window size cwnd is a product of a maximum congestion window size OLD_Max_CW of the old network causing congestion control divided by 2 and the weighting factor K. Herein, the division by 2 with respect to the maximum congestion window size OLD_Max_CW is introduced in order to basically restrain a packet error from occurring due to load exertion on the new network. In a general TCP, if 3-dup ACK signals are received in a maximum congestion window size, congestion control of reducing the congestion window size by half and subsequently performing communication again is performed. In the present invention, the same congestion control is also performed.

Next, the TCP sender 102 stores a second time TIME2 from the time point of occurrence of a retransmission timeout event to the time point of reception of ACK signal corresponding to a sequence number which is smaller than the maximum sequence number (Step 222).

Next, the TCP sender 102 calculates the retransmission timeout time RTO of the new network by using the first time TIME1 and the second time TIME2 (Step 224).

Now, a procedure of calculating the retransmission timeout time RTO of the new network by using the first time TIME1 and the second time TIME2 will be described.

Figure 3:
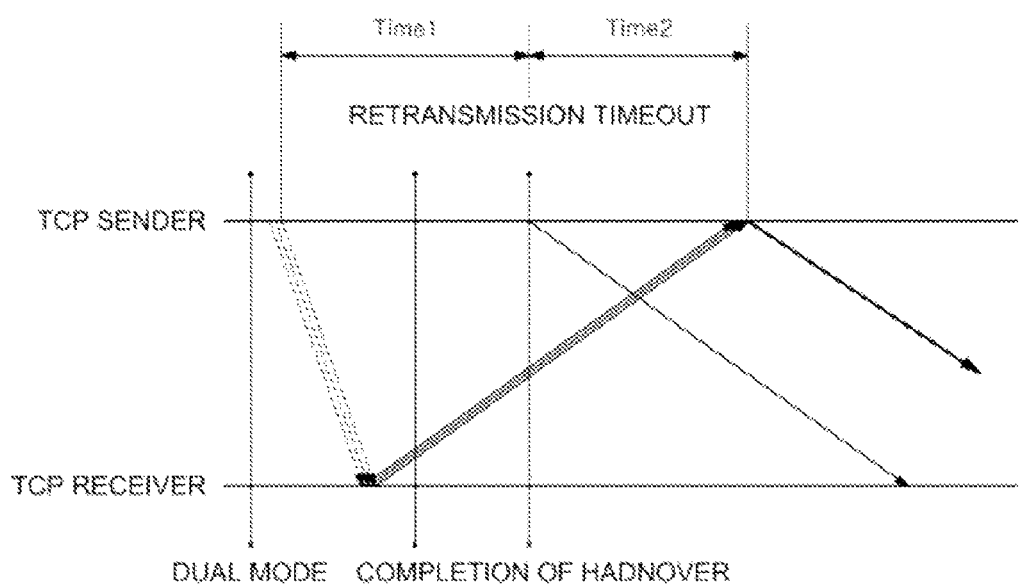
FIGS. 3 and 4 is a diagram illustrating an example of a packet transmission procedure according to the exemplary embodiment of the present invention.

FIG. 3 illustrates the first time TIME1 and the second time TIME2.

As expressed by Mathematical Formula 3, a sum of the first time TIME1 and the second time TIME2 is a value obtained by dividing a sum of the RTT of the old network Old_link_RTT and an estimated value of the RTT of the new network Estimated_New_link_RTT by 2. Therefore, the estimated value of the RTT of the new network Estimated_New_link_RTT is a value obtained by subtracting the estimated value of the RTT of the old network Estimated_Old_link_RTT from 2 times a sum of the first time TIME1 and the second time TIME2. Herein, since the TCP sender 102 calculates the estimated value of the RTT every time of general TCP communication, in the present invention, the estimated value is used as the estimated value of the RTT of a link in the old network Estimated_Old_link_RTT.

$$\text{time 1+time 2=0.5} \times (\text{Old link RTT+New link RTT})$$

$$\text{time 1+time 2} - (0.5 \times \text{estimated Old link RTT}) = 0.5 \times \text{New link RTT}$$

$$\text{New link RTT} = 2 \times (\text{time 1+time 2}) - \text{estimated Old link RTT} \quad [\text{Mathematical Formula 3}]$$

The RTO for the new network is calculated by using Mathematical Formula 4 and the estimated value of the RTT of the new network Estimated_New_link_RTT calculated by Mathematical Formula 3.

$$\text{New link Dev RTT} = -\beta) \times \text{New link RTT}$$

$$\text{New link RTO} = \text{New link estimated RTT} + (4 \times \text{New link Dev RTT}) \quad [\text{Mathematical Formula 4}]$$

In Mathematical Formula 4, New_link_dev_RTT is a deviation value of the RTT of the new network, and New_link_RTT is the estimated value of the RTT of the new network calculated by Mathematical Formula 3. In addition, $\beta$ is a weighting factor.

In the above-described exemplary embodiments of the present invention, only the maximum value of the sequence numbers of the packets transmitted through the old network is stored. However, it is obvious to the ordinarily skilled person in the related art that minimum and maximum values of the sequence numbers of the packets transmitted through the old network may be stored and, when an ACK signal corresponding to a sequence number between the minimum value and the maximum value is received, it may be determined to execute the upward vertical handover is executed.

INDUSTRIAL APPLICABILITY

According to the present invention, it is possible to obtain an effect of solving a problem in that a data transmission rate is decreased due to the performing of congestion control according to the occurrence of a retransmission timeout event even in the state that packet loss caused by channel congestion according to network characteristics such as an RTT (round trip time) in the overlay network environment does not occur during the upward vertical handover.

In addition, according to the present invention, it is possible to obtain an effect of preventing an overload from being exerted on a new network in a slow start phase mode by setting an optimum initial slow start limit value for the new network during the upward vertical handover.

In addition, according to the present invention, it is possible to obtain an effect of solving a problem in that a data transmission rate is decreased due to the occurrence of an unnecessary retransmission timeout event in the new network by setting an optimum retransmission timeout for the new network during the upward vertical handover.

The invention claimed is:

1. A data transmission rate control method in upward vertical handover by a TCP (transmission control protocol) sender in an overlay network environment, comprising steps of:

checking whether or not a retransmission timeout event occurs while communicating with a TCP receiver through a dual interface;

storing a sequence number of a packet having the largest sequence number among transmitting packets, and after that, performing congestion control if the retransmission timeout event occurs;

checking whether or not an ACK (acknowledge) signal corresponding to a sequence number which is equal to or smaller than the stored sequence number is received after performing the congestion control;

determining to execute upward vertical handover if the ACK signal sequence number is received; and calculating and setting a congestion window size of a new network when the TCP sender determines to execute the upward vertical handover, wherein the congestion window size of the new network is set to a product of a maximum congestion window size of an old network and a weighting factor; the weighting factor is set by using a data capacity of a link in the old network and a data capacity of a link in the new network; and the data capacity depends on a BDP (Bandwidth Delay Product) of the link and a buffer size of a relay device.

2. The data transmission rate control method according to claim 1, further comprising steps of:

estimating an RTT (Round Trip Time) of the new network when the TCP sender determines to execute the upward vertical handover; and calculating and setting a retransmission timeout time RTO by using the estimated RTT of the new network.

3. The data transmission rate control method according to claim 1, wherein the weighting factor is a ratio of the data capacity of the old network to the data capacity of the new network.

4. A data transmission rate control system in upward vertical handover in an overlay network environment, comprising:

a TCP (transmission control protocol) sender; and a TCP receiver communicating with the TCP sender through a dual interface, wherein the TCP sender checks whether or not an retransmission timeout event occurs while performing communication according to TCP, wherein the TCP sender stores a sequence number of a packet having the largest sequence number among transmitting packets, and after that, performs congestion control if the retransmission timeout event occurs, wherein the TCP sender checks whether or not ACK (acknowledge) signal corresponding to a sequence number which is equal to or smaller than the stored sequence number is received after performing the congestion control, wherein the TCP sender determines to execute the upward vertical handover if the ACK signal is received, wherein the TCP sender calculates and sets a congestion window size of a new network when the TCP sender determines to execute the upward vertical handover, wherein the congestion window size of the new network is set to a product of a maximum congestion window size of an old network and a weighting factor, wherein the weighting factor is set by using a data capacity of a link in the old network and a data capacity of a link in the new network, and wherein the data capacity depends on a BDP (Bandwidth Delay Product) of the link and a buffer size of a relay device.

5. The data transmission rate control system according to claim 4,
wherein the TCP sender estimates an RTT (Round Trip Time) of the new network when the TCP sender determines to execute the upward vertical handover is executed; and
wherein the TCP sender calculates and sets a retransmission timeout time RTO by using the estimated RTT of the new network.

6. The data transmission rate control system according to claim 4, wherein the weighting factor is a ratio of the data capacity of the old network to the data capacity of the new network.

* * * * *